United States Patent

[11] 3,542,101

[72] Inventor  Jan Tavsen Klint
              Havnegade 33, 5000 Odense, Denmark
[21] Appl. No. 817,512
[22] Filed     April 18, 1969
[45] Patented  Nov. 24, 1970
[32] Priority  April 29, 1968
[33]           Denmark
[31]           No. 1974/68

[54] APPARATUS FOR MECHANICALLY BREAKING EGGS
     5 Claims, 9 Drawing Figs.
[52] U.S. Cl. .................................................. 146/2
[51] Int. Cl. ............................................... A47j 43/14
[50] Field of Search ....................................... 146/2.4

[56]                References Cited
              UNITED STATES PATENTS
3,326,255  6/1967  Klint ............................. 146/2
3,455,356  7/1969  Classen .......................... 146/2

Primary Examiner—Willie G. Abercrombie
Attorney—Sughrue, Rothwell, Mion, Zinn and Mac Peak ABSTRACT: Apparatus for breaking eggs in which a knife is caused to penetrate the egg shell in a positively controlled, inwardly directed movement effected by means of a stationary cam member acting on the knife. A detector member which may be the cam member, senses the size of an egg and delivers a signal which adjust the inner end position of the knife according to the size of the egg in order to prevent the knife from penetrating too deeply into the interior of the egg.

APPARATUS FOR MECHANICALLY BREAKING EGGS

BACKGROUND OF THE INVENTION

This invention relates to an apparatus for mechanically breaking or cracking eggs by means of movable gripper units with pairs of axially opposed gripper members which are arranged to hold and position an egg centrally in relation to at least one knife which can be made to penetrate or cut through the eggshell in a positively controlled movement when a gripper unit passes a stationary cam means which cooperates with the knife. Such apparatus is described in my U.S. Pat. No. 3,326,255.

The positive control of the movement of the knife or knives has made it possible to reduce the percentage of so-called "melanges", i.e. eggs, in which the yolk and the white get mixed or run together and, consequently, cannot be separated later. This is probably due to the fact that cutting the eggshell rather than causing it to break by a sharp impact or blow avoids the formation in the interior of the egg of shock waves which may lead to rupture of the yolk membrane. In the known apparatus referred to above, the positive control of the movement of the knives towards and through the eggshell can only be effected if the eggs are graded or sorted according to size beforehand, because the knife may only be allowed to penetrate a relatively short distance through the shell in order to avoid the risk of cutting through the yolk membrane. Since the eggs are normally received unsorted from the supplier and with rather great variations in size, it has hitherto been necessary to carry out a time-consuming and rather fine or selective grading of the eggs, a temporary storing of the various eggsize groups and a readjustment of the control members of the apparatus when changing from one size or grade to another.

SUMMARY OF THE INVENTION

According to the invention there is provided an apparatus for mechanically breaking eggs, comprising movable gripper units, each of said gripper units having a pair of axially opposed gripper means and means for resiliently urging said gripper means towards one another to hold an egg therebetween, means for moving said gripper units in a predetermined cyclical path, at least one knife, a stationary cam member positioned along said path and cooperating with said knife to apply to said knife a positively controlled movement from a first to a second end position, whereby said knife is caused to penetrate the shell of an egg held by said gripper means, detector means arranged to sense the size of an egg and to deliver a corresponding signal representing the egg size, and means actuated by said detector means to adjust said second end position of said knife movement in dependence of said signal when the gripper unit holding that egg is moved past said cam member.

With an apparatus according to the invention a batch of eggs received from a supplier can be processed directly without any preceding grading, since the apparatus itself effects the requisite adjustment of the movement of the knife for each egg, which ensures that the knife, irrespective of the size of the egg, cuts with certainty through the egg shell, without, however, penetrating so far as to damage the yolk membrane. The costs incurred in the breaking are quite considerably reduced hereby, also because the formerly required temporary storing of the various egg sizes is obviated. As an apparatus of the kind dealt with here often has a capacity or processing rate of 7,000 or more eggs per hour, it will be appreciated that with the known technique temporary storage space for a considerable quantity of eggs had to be provided, if too frequent readjustments of the apparatus were to be avoided.

From U.S. Pat. No. 3ll,150 there is known an apparatus which is capable of breaking eggs without prior grading, but the apparatus differs from that of the present invention, in that the knife does not cut through the eggshell, but is caused to strike against the shell by the release of a powerful spring, which in practice leads to the above-mentioned damaging of the yolk membrane. The egg is supported by a bisected bowl, from the underside of which the knife delivers an impact against the eggshell and it is held against the bowl by spring-loaded arms. In addition to the unfavorable crushing of the eggshell as a result of the impact action of the knife, the known apparatus has the further disadvantage, that the egg is not located or centered in relation to the bowl, so that, in particular with small eggs, it may be difficult to hold the egg securely during the cracking and to hold the shells during the subsequent discharge of the content of the egg when the two parts of the bowl swing away from one another.

In a preferred embodiment of my invention, the knife forms part of a gripper unit which furthermore has spring means biasing said knife towards an egg held by said gripper means, and said cam member is pivotally mounted. The apparatus further comprises spring means biasing said cam member towards said knife and means for locking the cam member at a predetermined moment of the movement of said gripper unit past said cam member to prevent further pivoting thereof.

In this embodiment the cam member thus has the double function of detecting or sensing the size of the egg and thereafter actuating the knife. During the passage of the gripper unit past the cam member, the knife which is held against the egg, presses the cam member outwardly depending upon the egg size, and therefore the position of the cam member in which it is locked, i.e. prevented from further outward movement, is a direct representation of the size of the egg. When locked, the cam member functions as a fixed or immovable actuating member which forcibly presses the knife through the eggshell. Since the starting point of this last phase of the knife's movement is adjusted precisely according to the size of the egg, the same applies to the final position of the knife. The embodiment is not only extremely simple in structural or constructional respect, but also possesses the advantage that the spring forces acting on the knife and the cam member can be held to such low values that even cracked eggs are able to guide the sensor movement of the cam member without any danger of the shell being further damaged.

Further characteristics and advantages of the invention will appear from the following description of an embodiment of the invention shown in the accompanying drawings.

DESCRIPTION OF THE PREFERRED EMBODIMENT

Figure 1:
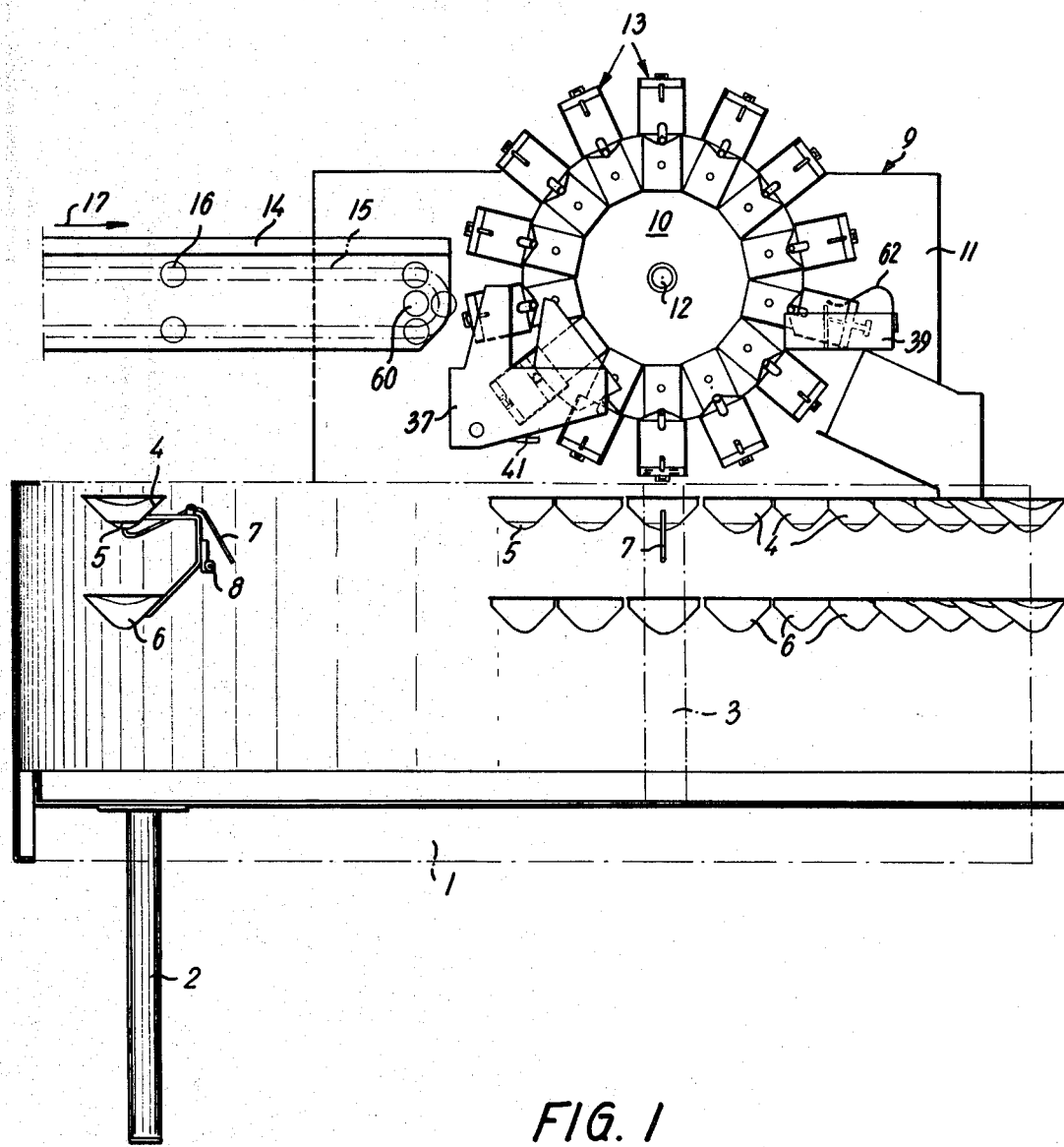
FIG. 1 is a diagrammatical front elevation of the apparatus with several components omitted for the sake of clarity.

The apparatus illustrated in FIG. 1 is constructed on a frame 1 shown diagrammatically, which is carried by legs 2. A vertical shaft 3 is rotatably supported in the frame 1 and a circular disc, not shown, is secured to the shaft which disc, at its circumference carries a plurality of cups or bowls 4, into which the content of the eggs cracked in the apparatus are discharged successively during the rotation of the shaft 3 and the bowls 4. Each bowl 4 has, in a known manner, an aperture in its bottom and a smaller bowl 5 rests along the edge of the aperture during the emptying of the egg. Below each bowl 4, a closed bowl 6 is mounted for receiving the egg whites and the bowl 5 is secured to a pivoting arm 7 which, through the action of control members, not shown, can raise the bowl 5 once or several times after the content of the egg has been emptied into the bowl 4. When the bowl 5 is raised, the egg-white can run down into the bowl 6, while the yolk remains in the bowl 5. When the separation of yolk and egg-white is terminated, the bowls 4 and 6 are pivoted simultaneously or successively about an axis 8, by which means the content of the respective bowls is led to separate collecting tanks for yolks and egg whites through outlet ducts which are not shown. Following this, the bowls are raised into the position shown at the left hand side in FIG. 1, which position they occupy when they pass the breaking unit described below.

The breaking unit is mounted on a casing generally denoted by 9, which houses the driving mechanism of the apparatus and certain control members and which is secured to the frame 1 behind the rotating bowls 4 and 5. The breaking unit comprises a disc 10 secured to a horizontal shaft 12 extending through the front plate 11 of the casing 9, and a plurality of gripper units, generally denoted by 13, are fitted on disc 10. The gripper units thus move in a vertical circular path and during the lowermost part of the movement they pass above the previously mentioned bowls 4. The rotation of the shafts 3 and 12 is synchronized, so that one gripper unit in its lowermost position stands precisely above an associated bowl 4.

The eggs to be broken are supplied on a conveyor 14, shown purely diagrammatically, the movement of which is synchronized with the rotation of the shafts 3 and 12. The conveyor comprises two parallel chains 15, in which a plurality of spool-shaped rollers 16 are rotatably supported at their extremities.

To each roller 16 there is secured a gear wheel, not shown, which, during the travel of the uppermost chain strands in the direction of the arrow 17, engages with a stationary rack, not shown, so that the rollers 16 rotate around their axes. The eggs are supplied, in a manner not shown in detail, to the conveyor 14, e.g. by means of a transverse conveyor known per se, which delivers a plurality of eggs simultaneously to the conveyor 14. On account of the rotation of the rollers 16, each egg is alined with its longitudinal axis in the direction of the rollers, i.e. transverse to the plane of FIG. 1 when being delivered at the right hand end of the conveyor to a gripper unit 13, which is described in greater detail below.

Each gripper unit 13, vide FIGS. 2—7 and FIG. 9, comprises an assembly plate 18 with a through hole for accommodating a bolt 19, by means of which the unit is clamped to the disc 10. The position of the gripper unit is secured by means of two guide pins 20. The gripper unit comprises two brackets or stirrups 21, which are rotatably supported around pins 22 at the outwards-facing edge of the plate 18. The pins 22 extend tangentially in relation to the disc 10. The two stirrups 21 are spring-loaded away from each other by means of a relatively strong torsion spring 23, vide FIG. 9, between the stirrups and the plate 18. The swinging away from each other of the stirrups is limited by a stop 24 secured to the plate 18.

Each stirrup 21 a cross member 25 is fixed between the two legs of the stirrup and a leaf spring 26 is secured to the cross member 25, for instance by means of two screws 65, as shown, so that the spring is easily exchangeable. At its extremity remote from the cross member the leaf spring carries a holder 66, to which a substantially hemispherically-shaped cup 27 for receiving one end of an egg is secured. Preferably the cup or gripper member 27 is made of an elastic material.

Figure 9:
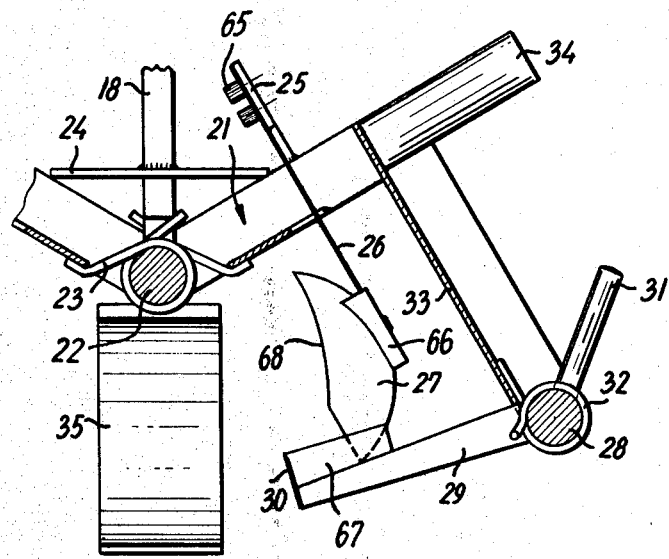
FIG. 9 is a fragmentary section of a gripper unit on a larger scale than FIGS. 3—7.

At the free end of each stirrup 21, a shaft 28 is rotatably supported parallel to the pins 22, and the shaft carries an arm 29, which extends inwards, below and past the cup 27. On the free end of the arm 29 a radially inwards-facing knife 30 having an upwards-facing, horizontal knife edge is secured. To the rear of the knife edge, two guide plates 67 are fitted to each arm 29, which guide plates are curved in such a way that subsequent to the breaking of an egg, as described below, they can assist the knife 30 in holding one part of the eggshell during the discharge of the content of the egg. An actuating pin 31 extending backwards from arm 29 is fixed to the shaft 28 and the shaft 28 is spring-loaded by a torsion spring 32, one end of which is held in a transverse bore in the arm 29, while its other end lies against a plate 33, which is welded between the two legs of the stirrup 21. The spring 32 biases the shaft and with it the knife in the direction inwards against the cup 27, so that the arm 29 normally lies against the cup 27, as shown in FIG. 9. Finally, an outwards-facing actuating pin 34 is secured to the stirrup 21.

Between the two stirrups 21, an arched or curved saddle 35 is welded to the radially outwards-facing edge of the assembly plate 18, which saddle extends over somewhat more than 90° and provides an additional support of an egg held between the cups 27 whereby the saddle takes up the force exerted by the knife 30 when breaking the egg.

Figure 2:
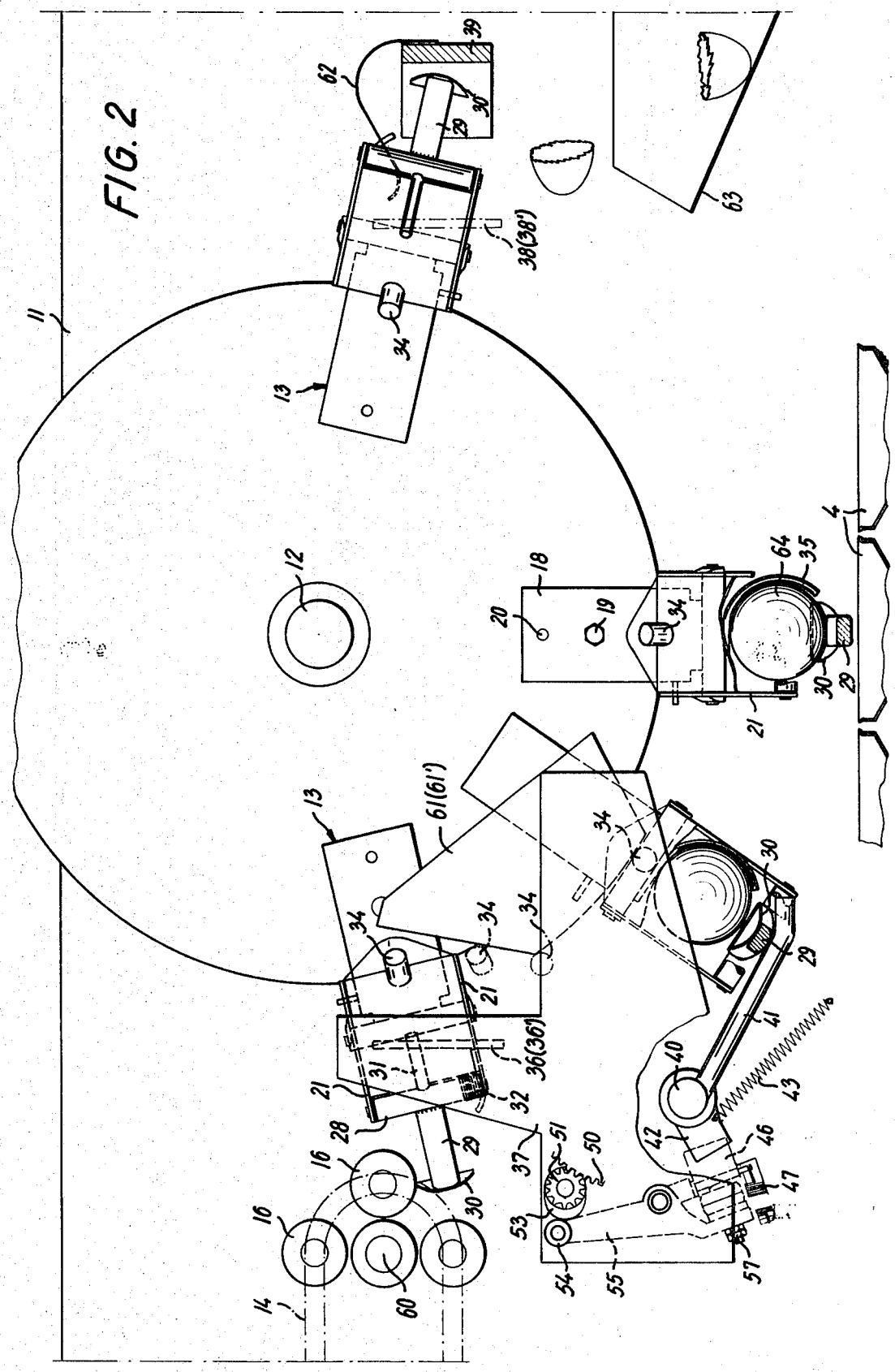
FIG. 2 is a front elevation on a larger scale showing one of the gripper units of the apparatus in different positions and some of the members cooperating therewith.
Figure 3:
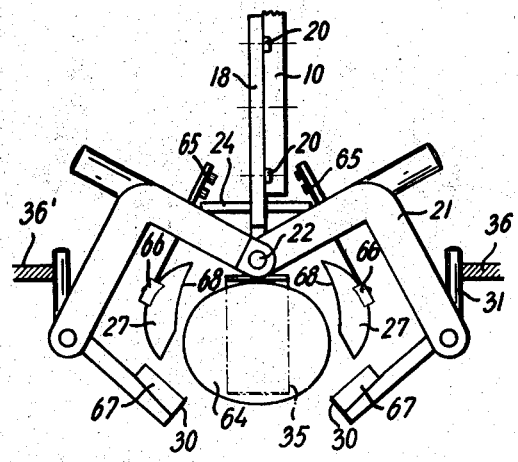
FIGS. 3—7 show the gripper unit in five different positions seen tangentially in relation to its direction of rotation.

A forward-facing cam 36 is mounted on the front plate 11 in the area in which the conveyor 14 delivers an egg to the gripper unit, vide FIGS. 2 and 3, and the cam interacts with the pin 31 on one stirrup 21 of the gripper unit. A similar cam 36' is mounted on the rear side of a bracket plate 37, which is fixed to the front plate 11 at such a distance from the plate that it lies in front of the gripper units. Approximately diametrically opposite the cam 36 another cam 38 is secured to front plate 11, see FIGS. 2 and 7, and the cam 38 cooperates with pin 31 after the egg has been broken and its contents discharged into a bowl 4. A similar cam 38' which interacts with the pin 31 on the other stirrup 21, is fixed to the inwards-facing side of a bracket 39 secured to the front plate 11.

A shaft 40 is pivotably supported in the front plate 11 and the bracket plate 37, and the shaft extends through the front plate 11 into the casing 9. Between the front plate and the bracket plate two arms 41 are fixed to the shaft 40, which arms interact with the arms 29 of the knives 30 in a manner described in greater detail below. A locking tongue or flap 42 is fixed to the shaft 40 internally of the casing 9, which locking tongue is connected to the front plate 11 by a tension spring 43. The spring 43 thereby tends to turn the shaft 40 in such a direction that the arms 41 are kept in contact with the knife arms 29. The turning of the tongue 42 and thereby of the shaft 40 is limited by a stop 44 on a stationary brake shoe 45 bolted to the front plate, and the locking tongue 42 glides along the brake shoe during the rotation of the shaft.

On the opposite side of the locking tongue 42 there is a movable, angular brake shoe 46 which is pivotal around an axis parallel to the plate 11 whereby one leg 46a of the brake shoe may abut on the locking tongue 42 and press it firmly against the stationary brake shoe 45. The other leg 46b of the angular brake shoe 46 is, via a tension spring 47, connected to a bracket 48 fixed to the plate 11, and the spring 47 normally keeps the brake shoe 46 raised from the locking tongue 42.

A shaft 49 is supported rotatably in the casing 9 and is driven by the main shaft of the apparatus, not shown, which also drives the shafts 3 and 12 and the conveyor 14. Shaft 49 carries a gear wheel 50 which meshes with a smaller gear wheel 51 on a shaft 52 supported in the front plate 11. The total gear ratio between the shaft 12 and the shaft 52 is equal to the number of gripper units 13 on the disc 10. While the shaft 52 revolves 360°, one gripper unit 13 thus moves forward into the position previously occupied by the immediately preceding gripper unit. A cam disc 53 is fixed to the shaft 52, which cam disc engages a roller-shaped follower 54 on an actuating arm 55 that is rotatably supported on the front plate around a shaft 56. The opposite end of the arm 55 carries a bolt 57, the head 58 of which abuts against the leg 46b of the brake shoe 46. Between the head 58 of the bolt and the arm 55, a shock absorber 59 may be e.g. a rubber shock absorber. The contact between the roller 54 and the cam disc 53 is ensured by means of the spring 47.

The conveyor 14 may be driven from the shaft 49 via a chain drive, not shown, from this shaft to the drive shaft 60 of the conveyor, vide FIGS. 1 and 2.

Figure 4:
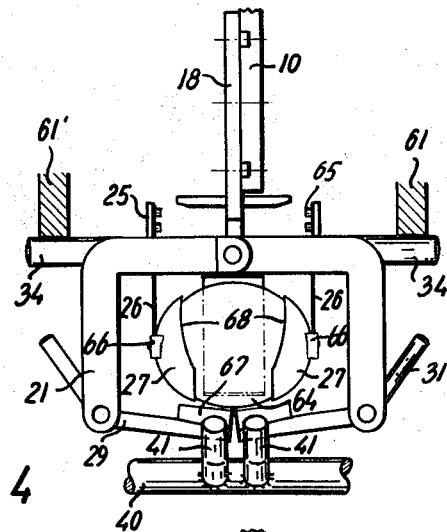
Figure 5:
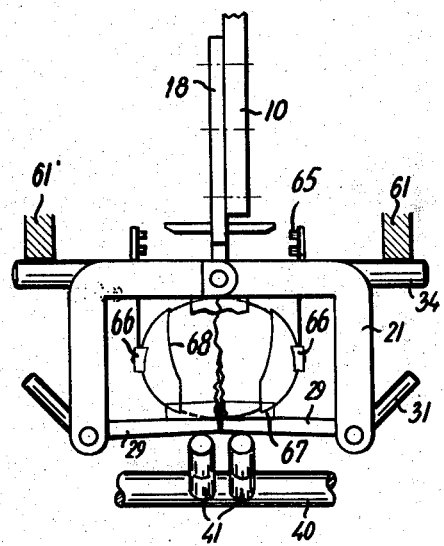

In the area immediately following the above-mentioned cams 36 and 36', a cam 61 is fixed to the front of the front plate 11, vide FIGS. 2, 4 and 5. Cam 61 interacts with the actuating pins 34, of the gripper units, and a corresponding cam 61' is mounted on the inside of the bracket plate 37. Two leaf springs 62 extending inwards against the disc 10 are fixed to the bracket at the discharge end of the apparatus, vide FIGS. 2 and 7, and below the bracket 39 a discharge chute 63 for the egg-shells is mounted.

The apparatus operates in the following manner. During the rotation of the disc 10, the two actuating pins 31 on each gripper unit come into contact with the cams 36 and 36' slightly prior to the moment at which the gripper unit occupies the position in which it is shown at the left hand side of FIG. 2. At that moment, the two stirrups 21 are swung away from each other as seen in FIGS. 2 and 3, whereby the torsion springs 23 keep the stirrups in contact with the stop 24. The cams 36 and 36' urge the knives 30 away from the cups 27 against the action of the torsion springs 32, and an egg delivered by the conveyor 14 can consequently roll unimpededly into the gripper unit where it comes to rest on the saddle 35 which in this positions is facing upwards. The unsymmetrical cutout 68 in each gripping cup facilitates the said movement of the egg on to the saddle 35 between the cups. Immediately following the depositing of the egg, the arms 34 of the two stirrups come into contact with the cams 61 and 61', which successively, against the action of the springs 23, move the stirrups into the position shown in FIG. 4, in which the two cups 27 lie against the egg 64 from each end thereof and hold it with an elastic axial pressure produced by the leaf springs 26. The arms 31 are disengaged from the cams 36 and 36' and the relatively weak springs 32 consequently swing the arms 29 inwards, until the knives 30 come into contact with the underside of the egg 64, as is seen in FIG. 4.

During the continued rotation of the disc 10, each of the knife arms 29 comes into contact with its associated arm 41 which is biased in the direction against the gripper unit by means of the tension spring 43. At this moment the brake shoe 46 is raised and the arms 41 can therefore freely swing outwards when influenced by the knife arms 29. It will be understood that the respective springs 43 and 32 are chosen to be so weak that the knives 30 are not capable of cutting through the eggshell during this part of the movement. In a predetermined position of the gripper unit, the arms 41 are consequently occupying a position that depends on the size of the egg. The stop 44 for the locking tongue 42 is situated so that the arms 29, when processing an egg of minimum size, are just able to turn the tongue away from the stop when they move along the arms 41 during the said part of the rotation of the gripper unit.

Figure 8:
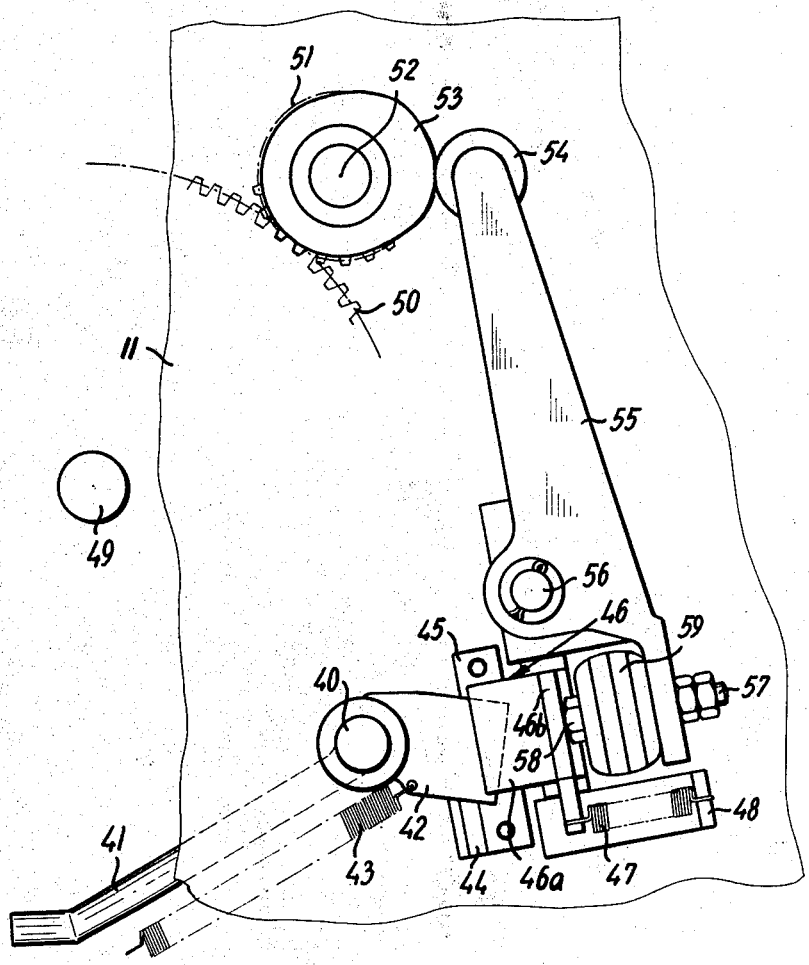
FIG. 8 is a plan view on a larger scale of the locking mechanism, also shown in FIG. 2, associated with a combined sensor and actuating member for the knives which cut through the eggshell.

At a predetermined moment of the rotation of the disc 10, the cam disc 53 actuates the brake shoe 46 via the arm 55, vide FIG. 8, by means of which the locking tongue 42 is clamped tightly between the pivotal shoe 46 and the stationary shoe 45. After this, the arms 41 can no longer move and during the continued rotation of the disc 10, the arms 29 will therefore, by interaction with the outermost parts of the arms 41, move in a positively controlled movement inwards against the egg, the shell of which will consequently be cut through by the knives 30, vide FIG. 5. This cutting through of the egg commences, by and large, in the position of the gripper unit 13, which in FIG. 2 is shown as No. 2 from the left. Immediately following this position, the cams 61 and 61' terminate and the springs 23 are therefore able to swing the two stirrups 21 away from each other. The two halves of the eggshell are now held each between a cup 27 and the associated knife 30, vide FIG. 6, whereby they are, at the same time, supported laterally by the two plates 67, and the content of the egg runs down into one of the bowls 4, which at this moment is located immediately below the gripper unit 13 and which is moving forward synchronously therewith. As previously mentioned the egg yolk is deposited in the movable bowl 5 and when this bowl is subsequently raised, as also mentioned earlier, the eggwhite runs out between the bowls 4 and 5 and down into the subjacent bowl 6.

Figure 6:
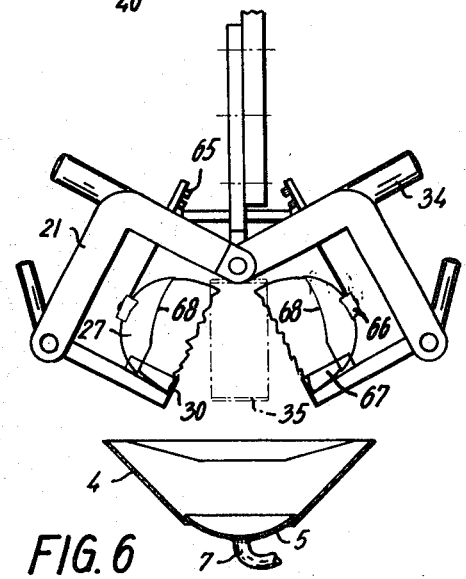
Figure 7:
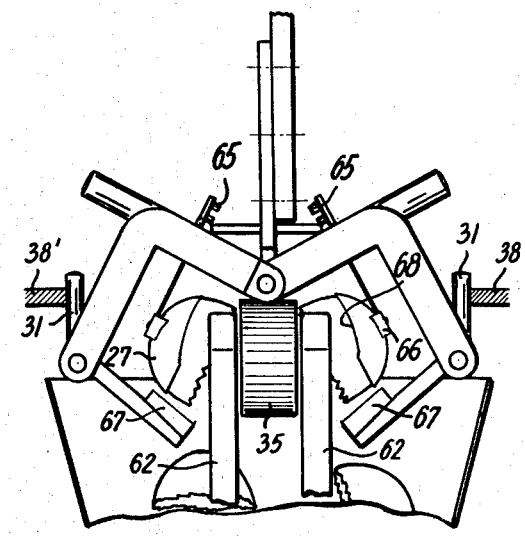

The position of the components of the gripper unit shown in FIG. 6 is maintained during the subsequent rotation of the disc 10 whereby the content of the egg is given adequate time for running down into the bowl 4. Following this, the actuating pins 31 come into contact with the two cams 38 and 38', vide FIG. 7 and the gripper unit 13 shown at the right-hand side in FIG. 2, whereby the knives 30 are swung away from the cups 27, from which the egg-shells can fall down on to the chute 63, as shown. If necessary, the removal of the shells is ensured by means of the above-described leaf springs 62, which extend towards the gripper unit each at one side of the saddle 35 thereof and which force the shells out of the cups 27. After the passage of the cams 38 and 38', the springs 32 move the arms 29 with the knives 30 back into the position shown in FIG. 9, which position is maintained until the gripper unit encounters the cams 36 and 36' immediately prior to the transfer of a new egg from the conveyor 14.

FURTHER EMBODIMENTS

The invention is not limited to the embodiment described above, but can, for instance, also be employed in an apparatus having pairs of cooperating gripper units and two counter-rotating discs which each carries one gripper unit of each pair. The movements of the gripper units and bowls, into which the content of the eggs is discharged, do not have to take place in circular paths nor in mutually perpendicular planes. The said components could, for instance, have rectilinear path sections in which they move parallel, even if such an embodiment will presumably be somewhat more complicated than the one described. Nor is it a condition that the sensing of the size of the egg is effected by means of the same members or components, which after being locked urge the knives through the egg, but this embodiment is regarded as being the simplest one from a constructional point of view. The sensing may be effected by means of a separate member or device which emits a signal which, with a suitable delay, is used for controlling the movement of the knife or the knives. In the embodiment shown the locking of the pivoting arms, which actuate the knives, could also be effected by means of an electromagnetic brake which is actuated in synchronism with the movement of the gripper units past the arms. It will also be possible to carry the invention into effect in apparatus, in which stationary knives are used in conjunction with travelling grippers holding the eggs, and in apparatus, in which no separation of egg yolks and egg whites takes place subsequent to the breaking.

I claim:

1. Apparatus for mechanically breaking eggs, comprising movable gripper units, each of said gripper units having a pair of axially opposed gripper means and means for resiliently urging said gripper means towards one another to hold an egg therebetween, means for moving said gripper units in a predetermined cyclical path, at least one knife, a stationary cam member positioned along said path and cooperating with said knife to apply to said knife a positively controlled movement from a first to a second end position, whereby said knife is caused to penetrate the shell of an egg held by said gripper means, detector means arranged to sense the size of an egg and to deliver a corresponding signal representing the egg size, and means actuated by said detector means to adjust said second end position of said knife movement in dependence of said signal when the gripper unit holding that egg is moved past said cam member.

2. Apparatus as claimed in claim 1 in which said knife forms part of a gripper unit which furthermore has spring means biasing said knife towards an egg held by said gripper means, and said cam member is pivotally mounted, the apparatus further comprising spring means biasing said cam member towards said knife and means for locking the cam member at a predetermined moment of the movement of said gripper unit past said cam member to prevent further pivoting thereof.

3. Apparatus as claimed in claim 2, comprising a plane locking tongue on said pivotal cam member, a stationary plane surface located in the apparatus so that said tongue slides along said surface during the pivotal movement of said cam member, a movable brake shoe and actuating means for pressing said brake shoe against said tongue, said actuating means including a rotary cam, means for rotating said cam in timed relation to the movement of said gripper unit, and a pivotal actuating arm cooperating with said rotary cam and said movable brake shoe.

4. Apparatus as claimed in claim 3 further comprising a shock absorber interposed between said actuating arm and said brake shoe.

5. Apparatus as claimed in claim 3, further comprising stop means for limiting the movement of said pivotal cam member towards said gripper unit.